United States Patent [19]

Abraham

[11] Patent Number: 6,023,106
[45] Date of Patent: Feb. 8, 2000

[54] POWER LINE CIRCUITS AND ADAPTORS FOR COUPLING CARRIER FREQUENCY CURRENT SIGNALS BETWEEN POWER LINES

[76] Inventor: Charles Abraham, 804 Cheswold Ct., Wayne, Pa. 19087

[21] Appl. No.: 08/795,028

[22] Filed: Feb. 4, 1997

Related U.S. Application Data

[63] Continuation of application No. 08/683,181, Jul. 18, 1996, abandoned, which is a continuation of application No. 08/349,041, Dec. 2, 1994, abandoned.

[51] Int. Cl.[7] ................................................. H04M 11/04
[52] U.S. Cl. .......................................... 307/3; 340/310.01
[58] Field of Search .................. 307/3, 17, 147, 307/1; 361/56, 111; 340/310.01, 310.02, 310.03, 310.04, 310.05, 310.06, 310.07, 310.08

[56] References Cited

U.S. PATENT DOCUMENTS

| | | |
|---|---|---|
| 3,454,780 | 7/1969 | Cominassi et al. ................... 307/17 |
| 4,066,912 | 1/1978 | Wetherell ............................... 307/3 |
| 4,323,882 | 4/1982 | Gajjar ............................. 340/310.05 |
| 4,355,884 | 10/1982 | Honda et al. ....................... 307/17 |
| 4,498,018 | 2/1985 | Lofmark ............................. 307/17 |
| 4,549,178 | 10/1985 | Lester ............................ 340/825.58 |
| 4,558,229 | 12/1985 | Massey et al. ...................... 307/17 |
| 4,567,511 | 1/1986 | Smith et al. .................. 340/310.02 |
| 4,723,115 | 2/1988 | Apter ................................. 333/181 |
| 5,066,939 | 11/1991 | Mansfield, Jr. ............... 340/310.06 |
| 5,136,455 | 8/1992 | Billingsley ........................... 361/56 |
| 5,327,316 | 7/1994 | Yi .......................................... 361/56 |
| 5,424,587 | 6/1995 | Federowicz ....................... 307/140 |

*Primary Examiner*—Richard T. Elms
*Attorney, Agent, or Firm*—Akin, Gump, Strauss, Hauer & Feld, L.L.P.

[57] ABSTRACT

Power line coupling circuits and adapters for coupling carrier frequency current signals between power lines. The coupling circuits can be arranged between outlets on different power lines, either single-phase or three-phase, within a building and power distribution systems in different buildings. The adapters are arranged to contain the coupling circuits.

20 Claims, 7 Drawing Sheets

POWER LINE CIRCUITS AND ADAPTORS FOR COUPLING CARRIER FREQUENCY CURRENT SIGNALS BETWEEN POWER LINES

This application is a continuation of application Ser. No. 08/683,181 filed Jul. 18, 1996, now abandoned, which is a continuation of application Ser. No. 08/349,041 filed Dec. 2, 1994, now abandoned.

TECHNICAL FIELD

The present invention relates, in general, to the transmission of information along power lines and, in particular, to circuits and adapters for coupling carrier frequency current signals between power lines.

BACKGROUND OF THE INVENTION

The lines by which power is delivered to a building and by which power is distributed in a building can be and are used to transmit information between buildings and between rooms within a building. Because transformers (e.g. three-phase, double-sided single-phase, and combinations of three-phase) are used in the transmission of power, when transmitting carrier frequency current signals, particularly high frequency signals (e.g. above one hundred KHz), over the power lines, the signals will not pass efficiently through the transformers or from one phase to another or between transformers.

Figure 1A:
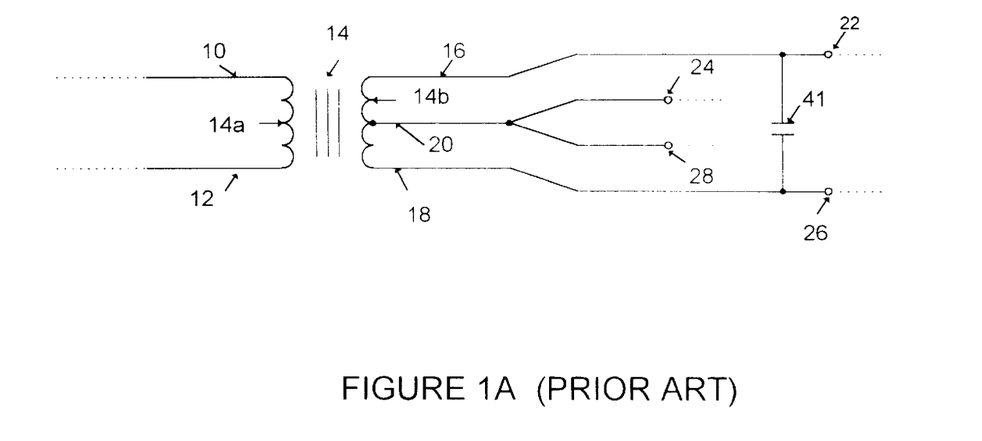
FIGS. 1A and 1B are circuit diagrams of a prior art arrangement for coupling carrier frequency current signals between outlets on different power lines within a building.
Figure 1B:
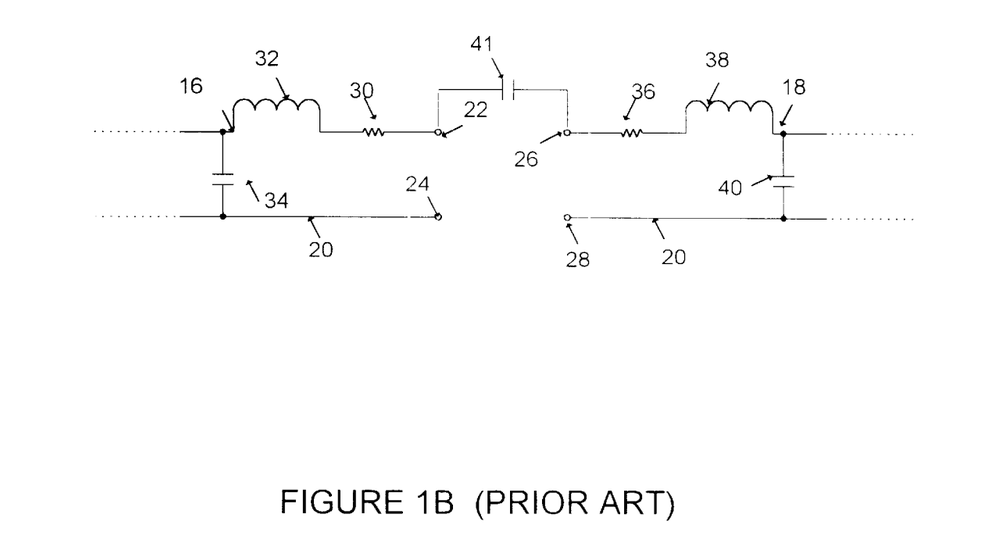

FIG. 1A illustrates one arrangement which has been suggested in the past for solving this problem by use of a coupling capacitor. Input power, for example at 240 volts, is delivered along a pair of power lines 10 and 12 to the primary winding 14a of a transformer 14 which develops power, for example at 120 volts, at each of two power lines 16 and 18 which are connected to the secondary 14b of the transformer, with a neutral line 20 at the center tap of the transformer secondary. Power lines 16 and 18 and neutral line 20 provide distribution of power within a building to various outlets, represented by pairs of terminals 22, 24 and 26, 28, in rooms within the building. FIG. 1B shows, by way of resistor 30, inductor 32, and capacitor 34, the characteristics of lines 16 and 20 and, by way of resistor 36, inductor 38, and capacitor 40, the characteristics of lines 18 and 20.

Information on carrier frequency current signals can be and has been transmitted between outlets (i.e. terminals 22, 24 and 26, 28) on lines 16, 20 and 18, 20 in different rooms within the building via these lines. These signals can be coupled through secondary winding 14b of transformer 14. However, because the transformer acts as a low pass filter at higher frequencies, these signals are attenuated significantly. It has been suggested that, instead of coupling the carrier frequency current signals between lines 16, 20 and lines 18, 20 through secondary winding 14b of transformer 14, these signals can be coupled between lines 16, 20 and lines 18, 20 through a capacitor 41 connected between power lines 16 and 18 to improve signal level. The use of such a capacitor for the coupling of carrier frequency current signals, however, does not preserve phase linear communications, caused in part by impedance mismatches, and, consequently, can introduce distortion and standing waves. Similar problems are likely for three-phase power input and three-phase power distribution and when coupling carrier frequency current signals between power distribution systems in different buildings.

SUMMARY OF THE INVENTION

A first embodiment of a power line coupling circuit, constructed in accordance with present invention, includes a first terminal adapted for connection to a first power line, a second terminal adapted for connection to a second power line, and a third terminal adapted for connection to a neutral line. Also included in this coupling circuit are a resistor having a first end connected to the third terminal, a first capacitor having a first end connected to the first terminal and a second end connected to a second end of the resistor, and a second capacitor having a first end connected to the second terminal and a second end connected to the second end of the resistor.

A second embodiment of a power line coupling circuit, constructed in accordance with the present invention, includes a first terminal adapted for connection to a first power line, a second terminal adapted for connection to a second power line, a third terminal adapted for connection to a third power line, and a fourth terminal adapted for connection to a neutral line. Also included in this coupling circuit are a resistor having a first end connected to the fourth terminal, a first capacitor having a first end connected to the first terminal and a second end connected to a second end of the resistor, a second capacitor having a first end connected to the second terminal and a second end connected to the second end of the resistor, and a third capacitor having a first end connected to the third terminal and a second end connected to the second end of the resistor.

A third embodiment of a power line coupling circuit, constructed in accordance with the present invention, includes a first terminal adapted for connection to a primary of a transformer to which first power lines are connected for supplying input power, a second terminal adapted for connection to a secondary of a the transformer to which second power lines are connected for distributing power, and a third terminal adapted for connection to a neutral line. Also included in this coupling circuit are a resistor having a first end connected to the third terminal, a first capacitor having a first end connected the first terminal and a second end connected to a second end of the resistor, and a second capacitor having a first end connected to the second terminal and a second end connected to the second end of the resistor.

Also, in accordance with the present invention, the first and second embodiments of a power line coupling circuit can be arranged as an adapter for an electrical outlet to which power is delivered and an electrical plug connected to an appliance. This adapter includes a housing having first and second end faces. A plurality of power prongs extend from the first end face of the housing and are adapted to fit within a plurality of power openings in an electrical outlet to which power lines are connected. A neutral prong also extends from the first end face of the housing and is adapted to fit within a neutral opening in the electrical outlet to which a neutral line is connected. Also included in this adapter are a plurality of power receptacles in the second end face of the housing which are individually connected to the power prongs and adapted to receive a plurality of power prongs of an electrical plug and a neutral receptacle in the second end face of the housing which is connected to the neutral prong and adapted to receive a neutral prong of the electrical plug. This adapter further includes signal coupling means within the housing and extending between the prongs and the receptacles for coupling carrier frequency current signals between the power openings in the electrical outlet.

DETAILED DESCRIPTION OF THE INVENTION

Figure 2A:
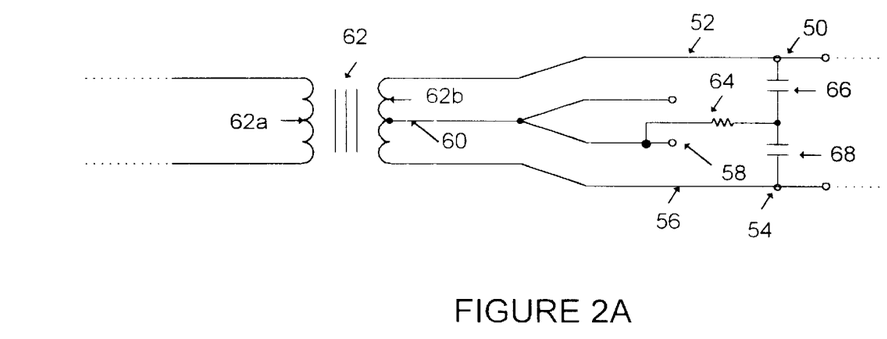
FIGS. 2A and 2B are circuit diagrams of a first embodiment of the present invention for coupling carrier frequency current signals between outlets on different power lines within a building.
Figure 2B:
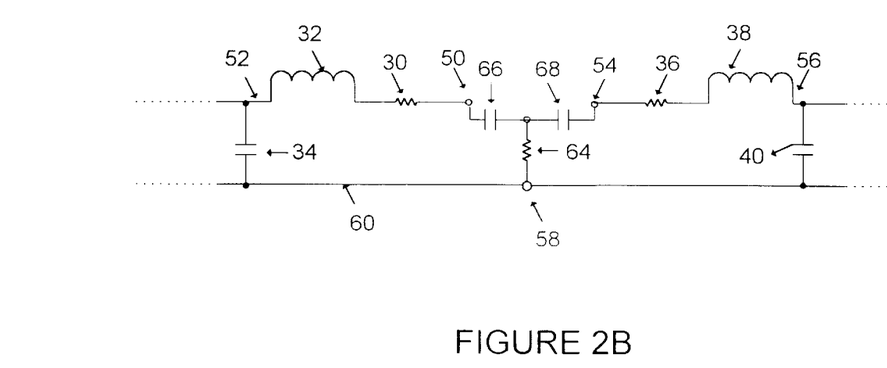

Referring to FIGS. 2A and 2B, a power line coupling circuit, constructed in accordance with a first embodiment of the present invention and which is arranged for coupling carrier frequency current signals between outlets on different power lines within a building with single-phase input power and single-phase power distribution, includes a first terminal 50 adapted for connection to a first power line 52, a second terminal 54 adapted for connection to a second power line 56, and a third terminal 58 adapted for connection to a neutral line 60. Single-phase input power is delivered to the primary winding 62a of a transformer 62. Power lines 52 and 56 and neutral line 60 are connected to the secondary winding 62b of transformer 62 for distribution of power.

The power line coupling circuit of FIGS. 2A and 2B also includes a resistor 64 having a first end connected to neutral terminal 58, a first capacitor 66 having a first end connected to power terminal 50 and a second end connected to a second end of resistor 64, and a second capacitor 68 having a first end connected to power terminal 54 and a second end connected to the second end of resistor 64. FIG. 2B shows, by way of resistor 30, inductor 32, and capacitor 34, the characteristics of lines 52 and 60 and, by way of resistor 36, inductor 38, and capacitor 40, the characteristics of lines 56 and 60.

Resistor 64, capacitor 66, and capacitor 68 can be inserted into the power distribution system at an outlet to which both power lines 52 and 56 are connected (e.g. an outlet for a clothes dryer) and, as will be explained in connection with FIGS. 5A, 5B, and 5C, preferably in an adapter which can be plugged into a conventional outlet and into which a conventional male plug can be inserted.

Figure 3A:
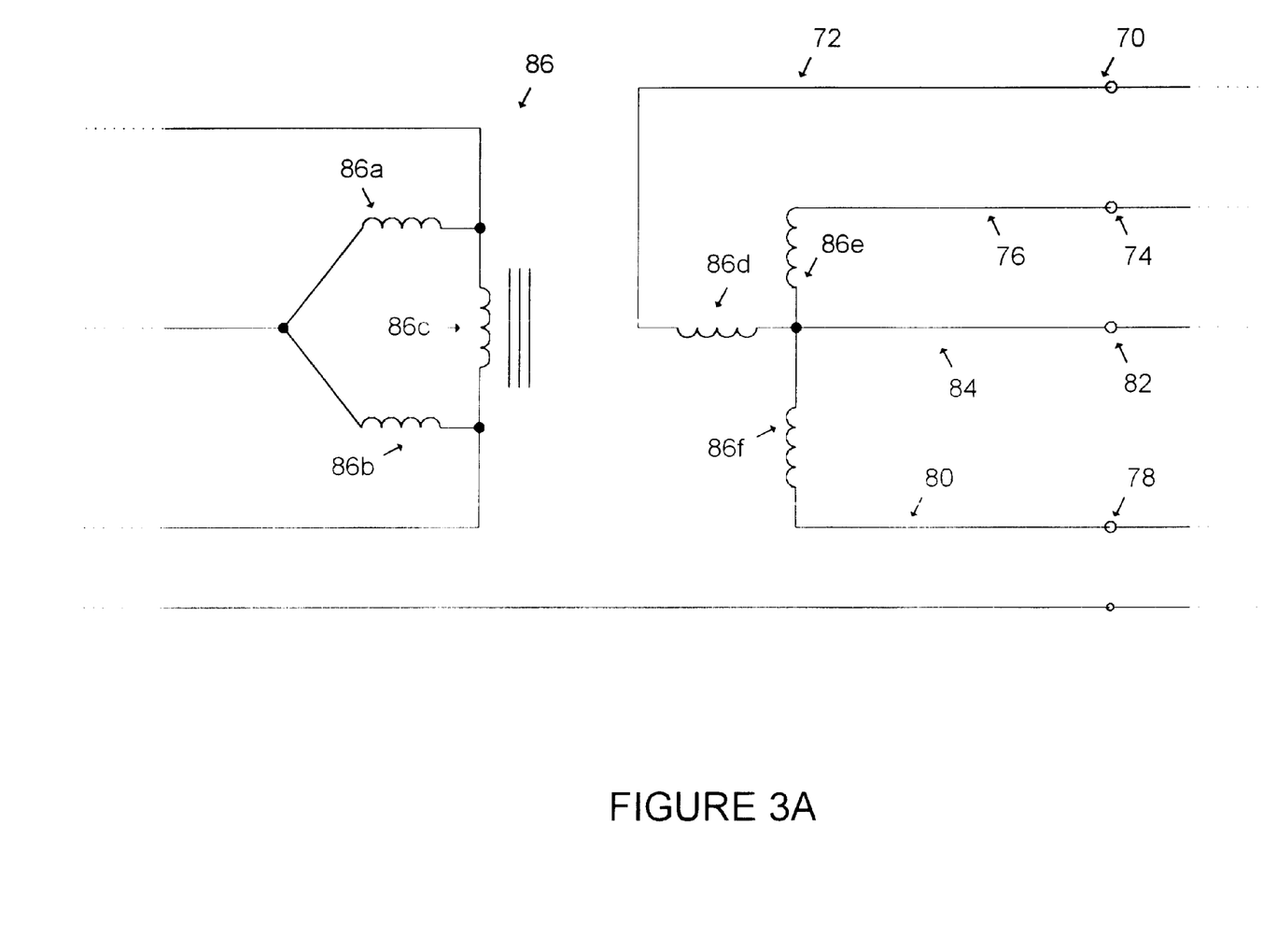
FIGS. 3A and 3B are circuit diagrams of a second embodiment of the present invention for coupling carrier frequency current signals between outlets on different power lines within a building.
Figure 3B:
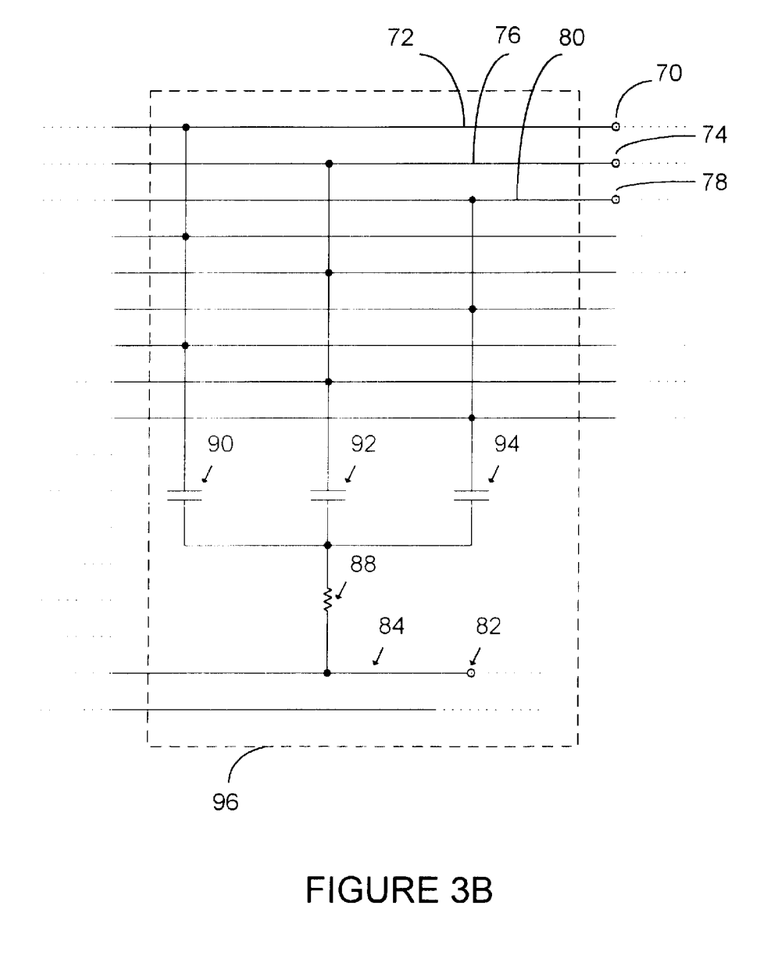

Referring to FIGS. 3A and 3B, a power line coupling circuit, constructed in accordance with a second embodiment of the present invention and which is arranged for coupling carrier frequency current signals between outlets on different power lines within a building with three-phase input power and three-phase power distribution, includes a first terminal 70 adapted for connection to a first power line 72, a second terminal 74 adapted for connection to a second power line 76, a third terminal 78 adapted for connection to a third power line 80, and a fourth terminal 82 adapted for connection to a neutral line 84. Three-phase input power is delivered to the primary windings 86a, 86b, and 86c of a transformer 86. Power lines 72, 76, and 80 and neutral line 84 are connected to secondary windings 86d, 86e, and 86f of transformer 86 for distribution of power.

The power line coupling circuit of FIGS. 3A and 3B also includes a resistor 88 having a first end connected to neutral terminal 82, a first capacitor 90 having a first end connected to power terminal 70 and a second end connected to a second end of 88 resistor, a second capacitor 92 having a first end connected to power terminal 74 and a second end connected to the second end of resistor 88, and a third capacitor 94 having a first end connected to terminal 78 line and a second end connected to the second end of resistor 88.

Resistor 88, capacitor 90, capacitor 92, and capacitor 94 can be inserted into the power distribution system at a fuse box which is represented by the dashed line box identified by reference numeral 96 and to which other lines in the power distribution system are connected. Alternatively, as will be explained in connection with FIGS. 6A, 6B, and 6C, resistor 88, capacitor 90, capacitor 92, and capacitor 94 can be arranged in an adapter which can be plugged into a conventional outlet and into which a conventional male plug can be inserted in buildings having three-phase power distribution.

Figure 4:
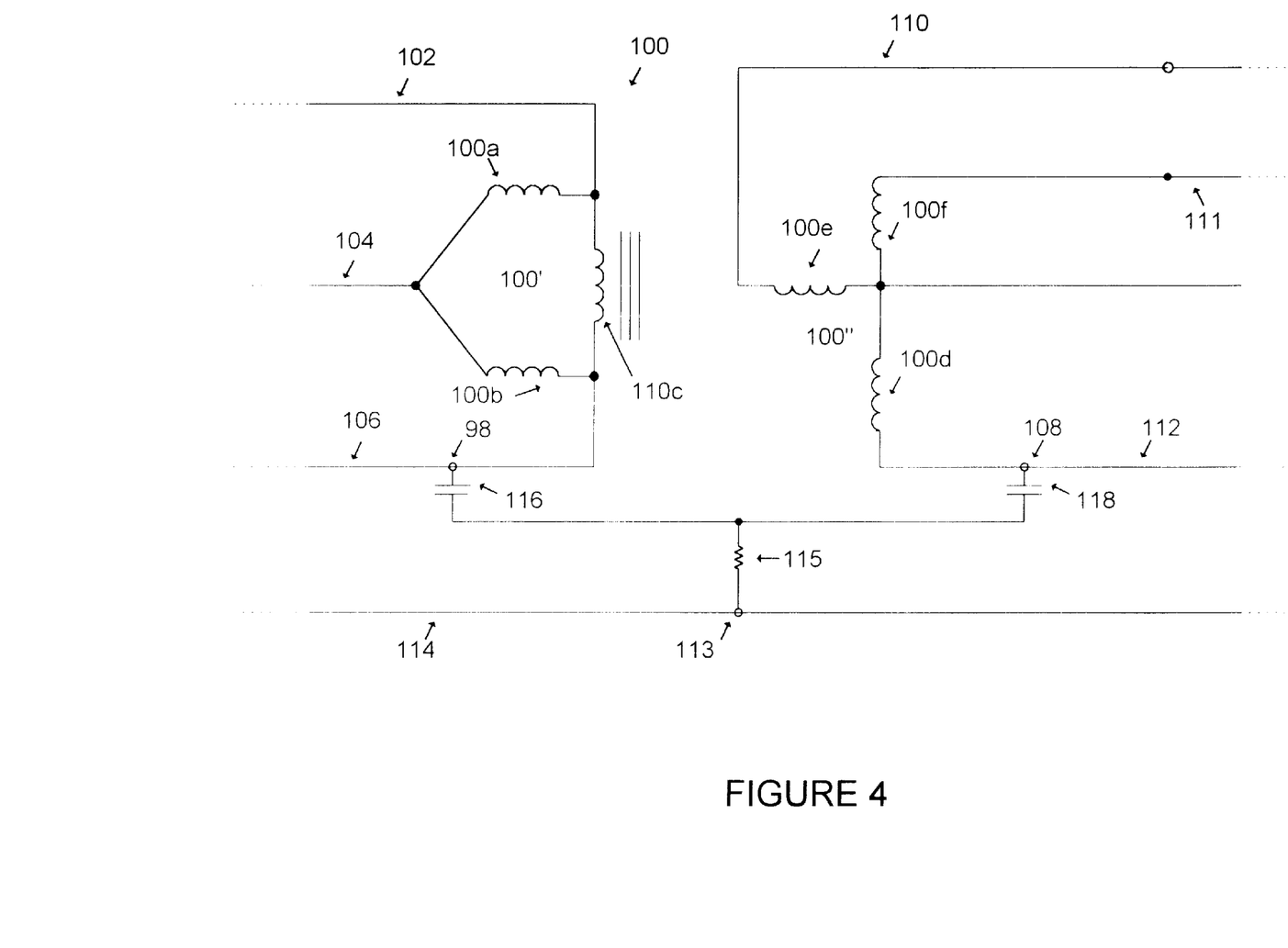
FIG. 4 is a circuit diagram of a third embodiment of the present invention for coupling carrier frequency current signals between power distribution systems in different buildings.

Referring to FIG. 4, a power line coupling circuit, constructed in accordance with a third embodiment of the present invention and which is arranged for coupling carrier frequency current signals between power distribution systems in different buildings, includes a first terminal 98 adapted for connection to the primary 100' of a transformer 100 to which first power lines 102, 104, and 106 are connected, a second terminal 108 adapted for connection to the secondary 100" of transformer 100 to which second power lines 110, 111, and 112 are connected, and a third terminal 113 adapted for connection to a neutral line 114. Three-phase input power is delivered to primary windings 100a, 100b, and 100c of transformer 100 via power lines 102, 104, and 106. Three-phase power developed at secondary windings 100d, 100e, and 100f of transformer 100 is distributed via power lines 110, 111, and 112. Although arranged in FIG. 4 for three-phase power input and three-phase power distribution, the embodiment of the invention of FIG. 4 can be arranged for single-phase power input and single-phase power distribution.

The power line coupling circuit of FIG. 4 also includes a resistor 115 having a first end connected to neutral terminal 113, a first capacitor 116 having a first end connected power terminal 98 and a second end connected to a second end of resistor 115, and a second capacitor 118 having a first end connected to power terminal 108 and a second end connected to the second end of resistor 115.

Representative values of the components of the power line coupling circuits of FIGS. 2A and 2B, 3A and 3B, and 4 are:

Resistors—100 Ω to 2000 Ω for frequencies of the carrier frequency current signal in the range of one hundred KHz to thirty MHz.

Capacitors—0.1 $\mu$f to 1 $\mu$f for voltages in the range of ten KV to one hundred twenty Volts.

Figure 5A:
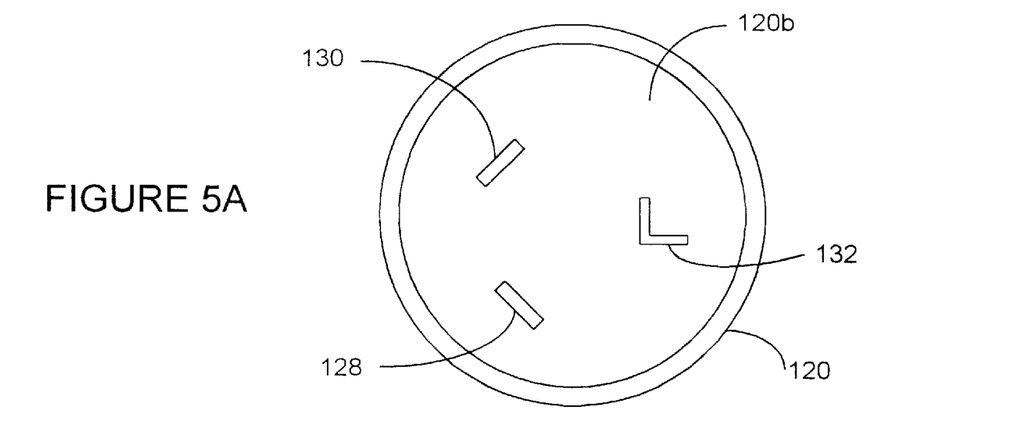
FIGS. 5A, 5B, and 5C are top, side, and bottom views, respectively, of a first embodiment of an adapter, constructed in accordance with the present invention, in which the first embodiment of a power line coupling circuit, constructed in accordance with the present invention, can be arranged.
Figure 5B:
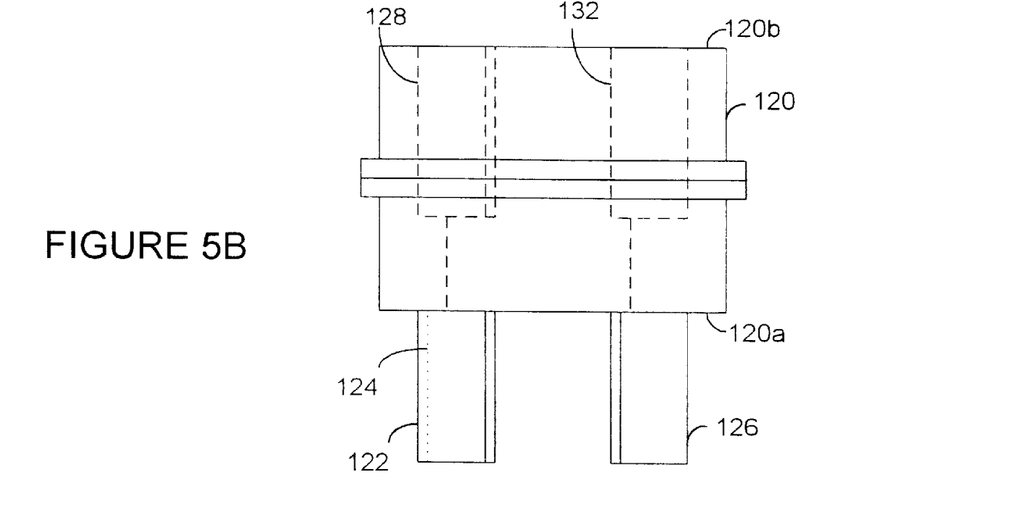
Figure 5C:
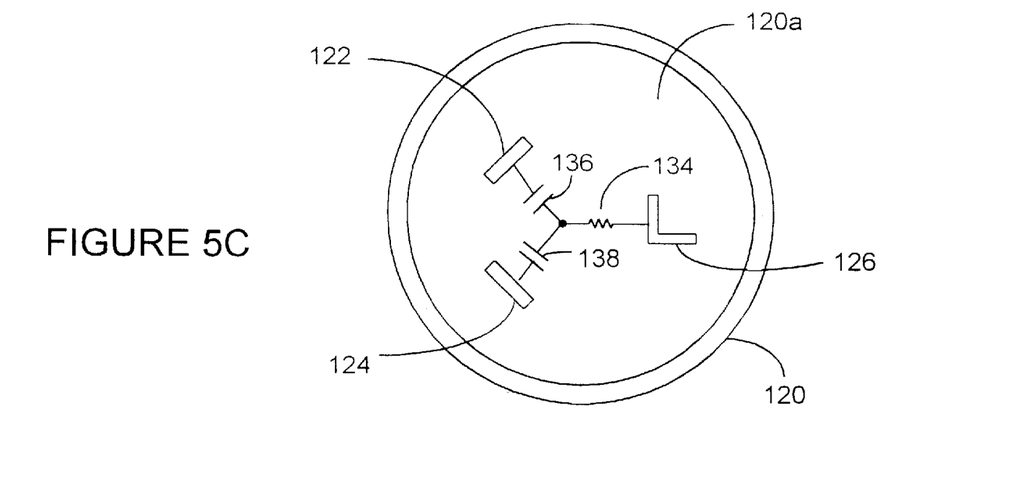

Referring to FIGS. 5A, 5B, and 5C, a first embodiment of an electrical adapter, constructed in accordance with the present invention, includes a housing 120 having a first end face 120a and a second end face 120b. A plurality of power prongs 122 and 124 extend from end face 120a of housing 120 and are adapted to fit within a plurality of power openings in an electrical outlet to which power lines are connected. A neutral prong 126 also extends from end face 120a of housing 120 and is adapted to fit within a neutral opening in the electrical outlet to which a neutral line is connected. The electrical outlet is not shown but has openings having shapes, sizes and locations corresponding to prongs 122, 124, and 126 extending from end face 120a of housing 120.

Also included in the adapter of FIGS. 5A, 5B, and 5C are a plurality of power receptacles 128 and 130 in end face 120b of housing 120 which are adapted to receive a plurality of power prongs of an electrical plug and a neutral receptacle 132 in end face 120b of housing 120 which is adapted to receive a neutral prong of the electrical plug. Power receptacles 128 and 130 are individually connected to power prongs 122 and 124, respectively, and neutral receptacle 132 is connected to neutral prong 126 by suitable means. The electrical plug is not shown but has prongs having shapes, sizes and locations corresponding to receptacles 128, 130, and 132 in end face 120b of housing 120.

The adapter of FIGS. 5A, 5B, and 5C further includes signal coupling means within housing 120 and extending between prongs 122, 124, and 126 and receptacles 128, 130, and 132 for coupling carrier frequency current signals between the power openings in the electrical outlet. Such means include, for the embodiment of the invention being described, a resistor 134 having a first end connected to neutral prong 126, a first capacitor 136 having a first end connected to power prong 122 and a second end connected to a second end of resistor 134, and a second capacitor 138 having a first end connected to power prong 124 and a second end connected to the second end of resistor 134.

Figure 6A:
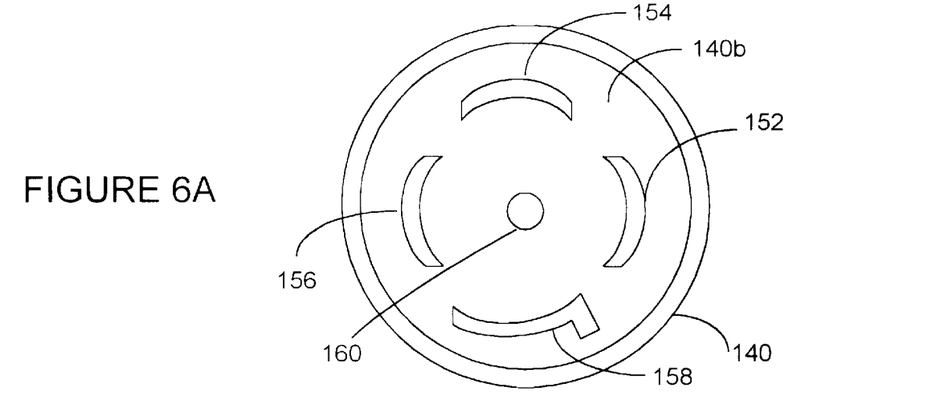
FIGS. 6A, 6B, and 6C are top, side, and bottom views, respectively, of a second embodiment of an adapter, constructed in accordance with the present invention, in which the second embodiment of a power line coupling circuit, constructed in accordance with the present invention, can be arranged.
Figure 6B:
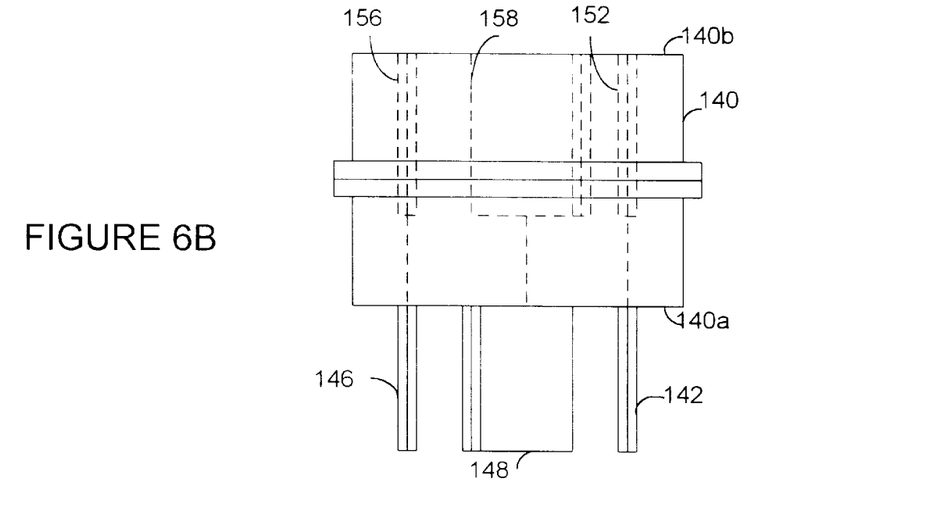
Figure 6C:
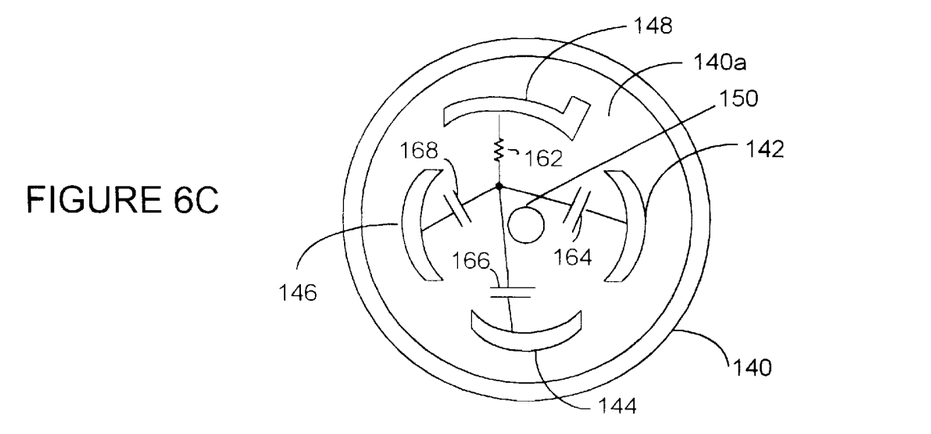

Referring to FIGS. 6A, 6B, and 6C, a second embodiment of an electrical adapter, constructed in accordance with the present invention, includes a housing 140 having a first end face 140a and second end face 140b. A plurality of power prongs 142, 144, and 146 extend from end face 140a of housing 140 and are adapted to fit within a plurality of power openings in an electrical outlet to which power lines are connected. A neutral prong 148 and a ground prong 150 also extend from end face 140a of housing 140 and are adapted to fit, respectively, within a neutral opening in the electrical outlet to which a neutral line is connected and within a ground opening in the electrical outlet. The electrical outlet is not shown but has openings having shapes, sizes and locations corresponding to prongs 142, 144, 146, 148, 150 extending from end face 140a of housing 140.

Also included in the adapter of FIGS. 6A, 6B, and 6C are a plurality of power receptacles 152, 154, and 156 in end face 140b of housing 140 which are adapted to receive a plurality of power prongs of an electrical plug. End face 140b of housing 140 also has a neutral receptacle 158 which is adapted to receive a neutral prong of the electrical plug and a ground receptacle 160 adapted to receive a ground prong of the electrical plug. Power receptacles 152, 154, and 156 are individually connected to power prongs 142, 144, and 146, respectively, neutral receptacle 158 is connected to neutral prong 148, and ground receptacle 160 is connected to ground prong 150 by suitable means. The electrical plug is not shown but has prongs having shapes, sizes and locations corresponding to receptacles 152, 154, 156, 158, and 160 in end face 140b of housing 140.

The adapter of FIGS. 6A, 6B, and 6C further includes signal coupling means within housing 140 and extending between prongs 142, 144, 146, and 148 and receptacles 152, 154, 156, and 158 for coupling carrier frequency current signals between the power openings in the electrical outlet. Such means include, for the embodiment of the invention being described, a resistor 162 having a first end connected to neutral prong 148, a first capacitor 164 having a first end connected to power prong 142 and a second end connected to a second end of resistor 162, a second capacitor 166 having a first end connected to power prong 144 and a second end connected to the second end of resistor 162, and a third capacitor 168 having a first end connected to power prong 146 and a second end connected to the second end of resistor 162.

What is claimed:

1. A circuit for coupling a carrier frequency signal to an electric power source, said source being characterized by the presence of a transformer, said circuit including only resistive and capacitive elements in circuit relation with each other, wherein the resistive element is connected to a neutral line and to one side of the capacitive element, and the other side of the capacitive element is connected to a power line, said resistive element and capacitive element being connected to their respective lines on the same side of the transformer.

2. A circuit for coupling a carrier frequency signal to an electric power source in accordance with claim 1 wherein the carrier frequency signal is within the range from 100 K Hz to 300 K Hz, the resistive element is from 100 ohms to 2000 ohms and the capacitive element is in the range from 0.1 uf to 1 uf for the power voltages in the range of 10 Kv to 120 V.

3. A circuit for coupling a carrier frequency signal to an electric power source in accordance with claim 1, wherein said transformer is a single phase transformer.

4. A circuit for coupling a carrier frequency signal to an electric power source, said source being characterized by the presence of a transformer, said circuit consisting of resistive and capacitive elements in circuit relation with each other wherein the resistive element is connected between the capacitive element and a neutral line on one side of the transformer, and the capacitive element is connected between the resistive element and a power line on the same side of the transformer as the neutral line.

5. A circuit for coupling a carrier frequency signal to an electric power source characterized by the presence of a transformer, said circuit including only resistive and capacitive elements in circuit relation with each other, said power source having three power lines and a neutral line in phase relation to each other, said resistive element being connected to the neutral line, and the capacitive element being connected to the resistive element and to two or more of the power lines on the same side of the transformer as the neutral line.

6. A circuit for coupling a carrier frequency signal to an electric power source in accordance with claim 5 wherein the capacitive element is connected on one side to the resistive element and on the other side to each of the three power lines.

7. A circuit for coupling a carrier frequency signal to an electric power source in accordance with claim 5 or 6 wherein the carrier frequency signal is within the range from 100 K Hz to 300 K Hz, the resistive element is from 100 ohms to 2000 ohms, and the capacitive element is in the range from 0.1 uf to 1 uf for power voltages in the range of 10 Kv to 120 Kv.

8. A circuit for coupling a carrier frequency signal to an electric power source, said source being characterized by the presence of a transformer, said circuit including only resistive and capacitive elements in circuit relation with each other, wherein the resistive element is adapted to be connected to a neutral line and one side of the capacitive element, and the other side of the capacitive element is adapted to be connected to a power line, said neutral and power lines being on the same side of the transformer.

9. A circuit for coupling a carrier frequency signal to an electric power source in accordance with claim 8, wherein the resistive and capacitive elements are mounted within a unitary connector, said connector including power prongs equal in number to the number of power lines, said prongs extending from said connector and being physically positioned to fit within receptacles in an electrical power outlet to which the power source is connected, said connector further including a neutral prong extending from the connector and being adapted for connection to a neutral terminal in said electric power outlet, said connector also including power receptacles and a neutral terminal for connection to a source of the carrier frequency signal, said capacitive element being connected to said power prongs and to said power receptacles, and said resistive element being connected to said capacitive element and to the neutral prong and terminal.

10. A circuit for coupling a carrier frequency signal to an electric power source in accordance with claim 9 wherein said connector includes a first and second power prong each adapted to fit within first and second receptacles, respectively, in the electric outlet to which the power lines are connected, and said adaptor includes first and second power receptacles.

11. A circuit for coupling a carrier frequency signal to an electric power source in accordance with claim 10 wherein the resistive element includes a resistor having a first end connected to the neutral prong, and the capacitive element includes a first capacitor having a first end connected to a power prong and a second end connected to a second end of said resistor, and a second capacitor having a first end connected to a second power prong and a second end connected to the second end of said resistor.

12. A circuit for coupling a carrier frequency signal to an electric power source, said power source being characterized by the presence of a multi phase transformer, said circuit including only resistive and capacitive elements in circuit relation with each other, the resistive element being connected to a neutral line and to one side of the capacitive element, the other side of the capacitive element being connected to one phase of the power line on both the primary and secondary side of the transformer.

13. A circuit for coupling a carrier frequency signal to an electric power source in accordance with claim 12 wherein said transformer is a three phase transformer.

14. A circuit for coupling a carrier frequency signal to an electric power source, said power source being characterized by the presence of a three phase transformer, said circuit including only resistive and capacitive elements in circuit relation to each other, the resistive element being connected to a neutral line and one side of the capacitive element, the other side of the capacitive element being connected to each of three phases on both the primary and secondary side of transformer.

15. A circuit for coupling a carrier frequency signal to an electric power source in accordance with claim 14 wherein the carrier frequency signal is within the range from 100 KHz to 300 KHz, the resistive element is from 100 ohms to 200 ohms, and the capacitive element is in the range from 0.1 uf to 1 uf for power voltages in the range of 10 Kv to 120 Kv.

16. A method for coupling a carrier frequency signal to an electric power source, said source being characterized by the presence of a transformer, said method including coupling said carrier frequency to the electric power source using a circuit consisting of resistive and capacitive elements in circuit relation to each other, connecting the resistive element to a neutral line and to one side of the capacitive element, and connecting the other side of the capacitive element to a power line, said connections between the resistive element and the neutral line and between the capacitive element and the power lines being made on the same side of the transformer.

17. A method of coupling a carrier frequency signal to an electric power source, said power source being characterized by the presence of a multi-phase transformer, said method including the steps of coupling said carrier frequency to said power source using a circuit consisting only of resistive and capacitive elements in circuit relation with each other, connecting the resistive element to a neutral line and to one side of the capacitive element, connecting the other side of the capacitive element to one phase of the power line on both the primary and secondary side of the transformer.

18. A method for coupling a carrier frequency signal to an electric power source in accordance with claim 17 wherein the transformer is a three phase transformer.

19. A method for coupling a carrier frequency signal to an electric power source, said power source being characterized by the presence of a three phase transformer, said method including coupling the carrier frequency to the power source using a circuit consisting only of resistive and capacitive elements in circuit relation to each other, connecting the resistive element to a neutral line and to one side of the capacitive element, and connecting the other side of the capacitive element to each of three phases on the primary and secondary side of the transformer.

20. A method for coupling a carrier frequency signal to an electric power source in accordance with claims 16, 17 or 19 wherein the carrier frequency signal to be coupled to the power source is within the range from 100 KHz to 300 KHz, the resistive element is from 100 ohms to 200 ohms, and the capacitive element is in the range from 0.1 uf to 1 uf for power voltages in the range of 10 Kv to 120 Kv.

* * * * *